(12) United States Patent
Deluca et al.

(10) Patent No.: US 10,769,664 B2
(45) Date of Patent: Sep. 8, 2020

(54) AUTOMATED MERCHANDISING BASED ON SOCIAL MEDIA CHATTER

(71) Applicant: International Business Machines Corporation, Armonk, NY (US)

(72) Inventors: Marco Deluca, Maple (CA); Leho Nigul, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 417 days.

(21) Appl. No.: 15/057,321

(22) Filed: Mar. 1, 2016

(65) Prior Publication Data

US 2017/0255965 A1    Sep. 7, 2017

(51) Int. Cl.
G06Q 30/02 (2012.01)
G06Q 50/00 (2012.01)
G06Q 10/08 (2012.01)
G06Q 30/06 (2012.01)

(52) U.S. Cl.
CPC ....... *G06Q 30/0261* (2013.01); *G06Q 10/087* (2013.01); *G06Q 30/0603* (2013.01); *G06Q 50/01* (2013.01)

(58) Field of Classification Search
CPC .................................. G06Q 30/0261
USPC .................................. 705/58, 14.58
See application file for complete search history.

(56) References Cited

U.S. PATENT DOCUMENTS

| 8,412,591 B2 | 4/2013 | Ajala |
| 8,949,889 B1 | 2/2015 | Erdmann |
| 2007/0185785 A1 | 8/2007 | Carlson et al. |
| 2008/0208718 A1 | 8/2008 | Hanson |
| 2010/0121710 A1 | 5/2010 | Chipman et al. |
| 2011/0246920 A1* | 10/2011 | Lebrun ............... G06Q 30/02 715/769 |
| 2012/0197724 A1 | 8/2012 | Kendall |
| 2013/0246186 A1 | 9/2013 | Chang et al. |
| 2014/0040374 A1 | 2/2014 | Olsen et al. |
| 2014/0201291 A1* | 7/2014 | Russell ............... H04L 67/22 709/206 |

(Continued)

OTHER PUBLICATIONS

"Appendix P: List of IBM Patents or Patent Applications Treated as Related", dated Jul. 26, 2017, pp. 1-2.

(Continued)

*Primary Examiner* — Daniel M Sorkowitz
(74) *Attorney, Agent, or Firm* — Edward J. Wixted, III (57) ABSTRACT

In an approach to automated merchandising, one or more computer processors detect access to an electronic store by a user. The one or more computer processors determine a location of the user. The one or more computer processors retrieve a plurality of social media communications associated with the location of the user, where social media communications include one or more publically available entries made by one or more users of one or more social media applications. The one or more computer processors determine whether the retrieved social media communications are associated with one or more merchandise associated with the electronic store. In response to determining the retrieved social media communications are associated with the one or more merchandise associated with the electronic store, the one or more computer processors determine a position of the one or more merchandise in one or more communication channels.

17 Claims, 3 Drawing Sheets

(56) References Cited

U.S. PATENT DOCUMENTS

2015/0058119 A1 2/2015 Atli et al.
2015/0269607 A1 9/2015 Steube et al.
2016/0342288 A1* 11/2016 Konik .................. G06F 3/0482

OTHER PUBLICATIONS

U.S. Appl. No. 15/660,185, filed Jul. 26, 2017; Entitled "Automated Merchandising Based on Social Media Chatter".

Davenport et al., "Know What Your Customers Want Before They Do", Harvard Business Review, Dec. 2011 Issue, 12 pages, <https://hbr.org/2011/12/know-what-your-customers-want-before-they-do>.

Shete et al., "An Overview of Location-Based Online Shopping Application" International Journal for Research in Emerging Science and Technology, E-ISSN: 2349-7610, vol. 2, Special Issue 1, Mar. 2015, Copyright © 2015 IJREST, pp. 104-107, <ijrest.net/downloads/volume-2/special-issue-1/pid-m15ug516.pdf>.

* cited by examiner

FIG. 3 ial, and the display of the products in such a way that it stimulates interest and entices customers to make a purchase. For example, visual display merchandising may be employed to stimulate consumers to increase spending based on a product design, selection, packaging, pricing, and display. Visual display merchandising may further include disciplines and discounting, presentation of products and displays, and decisions regarding which products should be presented to a particular customer at a given time.

AUTOMATED MERCHANDISING BASED ON SOCIAL MEDIA CHATTER

BACKGROUND OF THE INVENTION

The present invention relates generally to the field of e-commerce, and more particularly to automated merchandising based on social media chatter.

The Internet may be used to facilitate the sale and purchase of goods and services. As the Internet has continued to expand, a robust electronic marketplace, known as electronic commerce (i.e., e-commerce), has developed, where buyers can find and purchase most anything that is available by sellers. E-commerce may be understood as the trading or facilitation of trading of goods or services through a computer network, such as the Internet. More specifically, e-commerce may draw on technologies such as mobile commerce, electronic funds transfer, supply chain management, Internet marketing, online transaction processing, electronic data interchange (EDI), inventory management systems, and automated data collection systems. Typically e-commerce may employ the World Wide Web for at least one part of a transaction's life cycle, although other technologies, such as e-mail, may also be used. For example, online shopping (i.e., electronic retail ("e-tail") or e-shopping) is a form of electronic commerce which allows consumers to directly buy goods or services from a seller over the Internet through the use of a web browser.

Whether in a physical retail store or via the Internet, the use of merchandising may be employed. Merchandising may generally be understood as any practice which contributes to the sale of products to a retail consumer. At a retail in-store level, merchandising may refer to a variety of products available for sale and the display of the products in such a way that it stimulates interest and entices customers to make a purchase. For example, visual display merchandising may be employed to stimulate consumers to increase spending based on a product design, selection, packaging, pricing, and display. Visual display merchandising may further include disciplines and discounting, presentation of products and displays, and decisions regarding which products should be presented to a particular customer at a given time.

SUMMARY

Embodiments of the present invention disclose a method, a computer program product, and a system for automated merchandising. The method may include one or more computer processors detecting access to an electronic store by a user. The one or more computer processors determine a location of the user. The one or more computer processors retrieve a plurality of social media communications associated with the location of the user, where social media communications include one or more publically available entries made by one or more users of one or more social media applications. The one or more computer processors determine whether the retrieved social media communications are associated with one or more merchandise associated with the electronic store. In response to determining the retrieved social media communications are associated with the one or more merchandise associated with the electronic store, the one or more computer processors determine a position of the one or more merchandise in one or more communication channels.

DETAILED DESCRIPTION

Merchandisers are responsible for attracting customers through the proper placement of goods that are associated with a specific category. However, online merchandisers may struggle to predict a demand for particular items that are associated with a particular category since a plurality of factors may exist that can influence customer behaviors. Typically, merchandisers may rely on historical data, inventory levels, and other static key performance indicators (KPIs) to determine which products that are associated with a particular category should be boosted, i.e., adjusted to a more prominent position on a web page or within search results, and which products should be buried, i.e., adjusted to a less prominent position. For example, a merchandiser may choose to boost a product that sold well in the same week of the previous month, for which inventory is high and margin is high. On the other hand, a merchandiser may choose to boost a product based merely on a hunch. Thus, depending on the circumstances behind a merchandiser's decision making, the potential for maximizing sales for products within a given category may be compromised. Embodiments of the present invention recognize that improvements in merchandising may be gained by analyzing social media chatter in a customer's geo-location at the time the customer accesses an electronic store to determine merchandise trends and dynamically position merchandise on the electronic store's web page or within the customer's search results. Implementation of embodiments of the invention may take a variety of forms, and exemplary implementation details are discussed subsequently with reference to the Figures.

Figure 1:
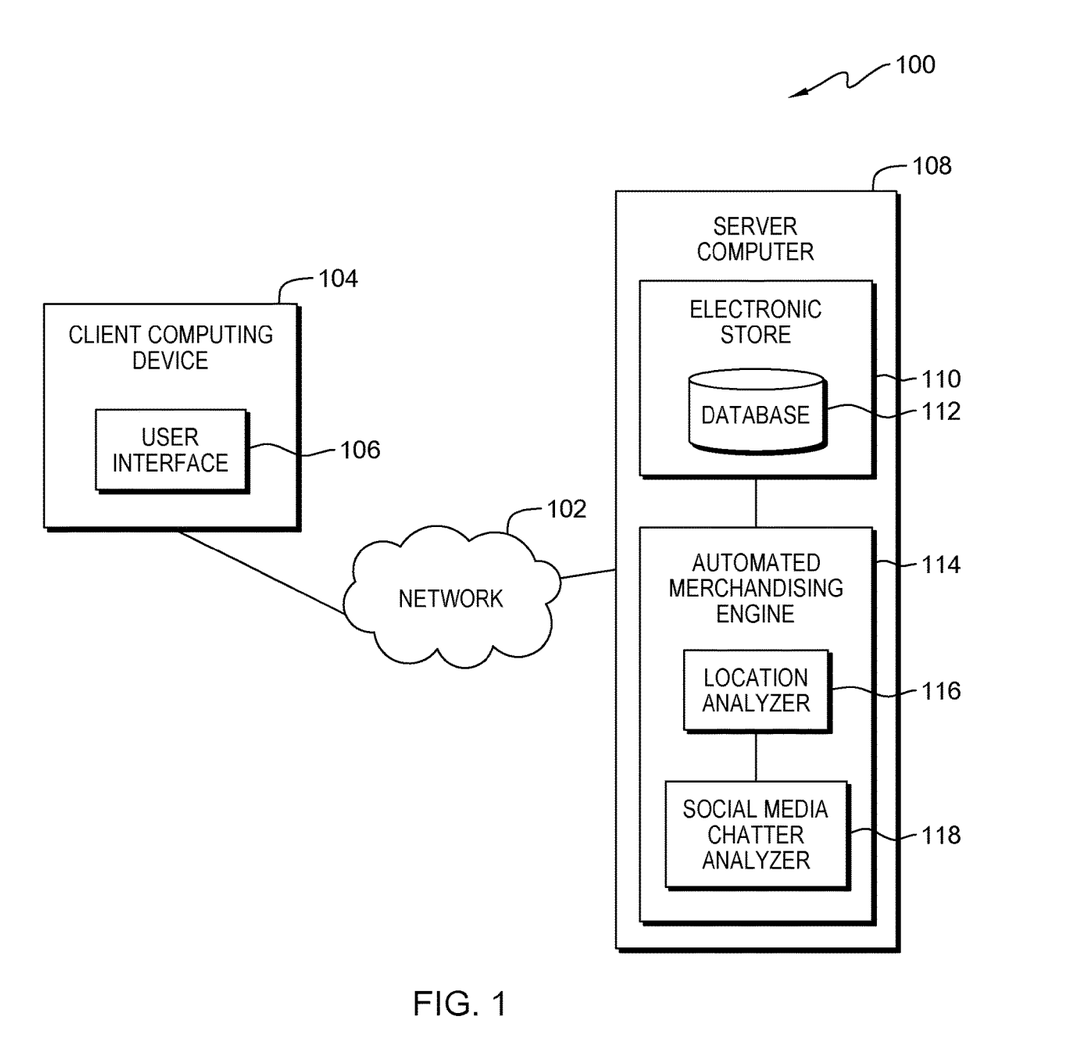
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes client computing device 104 and server computer 108, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between client computing device 104, server computer 108, and other computing devices (not shown) within distributed data processing environment 100.

Client computing device 104 can be a laptop computer, a tablet computer, a smart phone, or any programmable electronic device capable of communicating with various components and devices within distributed data processing environment 100, via network 102. In general, client computing device 104 represents any programmable electronic device or combination of programmable electronic devices capable of executing machine readable program instructions and communicating with other computing devices (not shown) within distributed data processing environment 100 via a network, such as network 102. Client computing device 104 includes user interface 106.

User interface 106 provides an interface between a user of client computing device 104 and server computer 108. In one embodiment, user interface 106 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, user interface 106 may also be mobile application software that provides an interface between a user of client computing device 104 and server computer 108. Mobile application software, or an "app," is a computer program designed to run on smart phones, tablet computers and other mobile devices. User interface 106 enables a user of client computing device 104 to access server computer 108 for e-commerce and online shopping.

Server computer 108 can be a standalone computing device, a management server, a web server, a mobile computing device, or any other electronic device or computing system capable of receiving, sending, and processing data. In other embodiments, server computer 108 can represent a server computing system utilizing multiple computers as a server system, such as in a cloud computing environment. In another embodiment, server computer 108 can be a laptop computer, a tablet computer, a netbook computer, a personal computer (PC), a desktop computer, a personal digital assistant (PDA), a smart phone, or any programmable electronic device capable of communicating with client computing device 104 and other computing devices (not shown) within distributed data processing environment 100 via network 102. In another embodiment, server computer 108 represents a computing system utilizing clustered computers and components (e.g., database server computers, application server computers, etc.) that act as a single pool of seamless resources when accessed within distributed data processing environment 100. Server computer 108 includes electronic store 110 and automated merchandising engine 114. Server computer 108 may include internal and external hardware components, as depicted and described in further detail with respect to FIG. 3.

Electronic store 110 is one of a plurality of e-commerce retailers with a presence on the Web. Electronic store 110 may sell one or more of a variety of products. The collection of products may be referred to as a catalog. In one embodiment, electronic store 110 may include an alternative channel of entry for a user to access the catalog. For example, a user may call electronic store 110 on a telephone or visit a "brick and mortar" store associated with electronic store 110. Electronic store 110 includes database 112.

In the depicted embodiment, database 112 resides on server computer 108. In another embodiment, database 112 may reside elsewhere within distributed data processing environment 100 provided electronic store 110 and automated merchandising engine 114 have access to database 112. A database is an organized collection of data. Database 112 can be implemented with any type of storage device capable of storing data and configuration files that can be accessed and utilized by server computer 108, such as a database server, a hard disk drive, or a flash memory. Database 112 stores a product catalog for electronic store 110. Database 112 may also inventory information corresponding to the products in the product catalog.

Automated merchandising engine 114 uses location-specific social media chatter to customize merchandising strategy to a particular user or customer. As used herein, social media chatter includes any publically available communication, posts, or entries made by one or more users of a social media application on a plurality of topics, where the user may make entries using one or more of text, still images, video recording, audio recording, etc. Upon detecting access by a user to an electronic store, such as electronic store 110, automated merchandising engine 114 determines the user's location. Automated merchandising engine 114 retrieves location-specific social media chatter and determines whether the chatter includes any references to any merchandise sold by electronic store 110. Automated merchandising engine 114 creates a merchandising score, based on the retrieved social media chatter, and uses the score to determine positioning of the referenced merchandise on the web site, or within search results, of electronic store 110. In the depicted embodiment, automated merchandising engine 114 includes two components: location analyzer 116 and social media chatter analyzer 118. In another embodiment, the functions of location analyzer 116 and social media chatter analyzer 118 may be fully integrated into automated merchandising engine 114 such that automated merchandising engine 114 is a standalone software program that includes the functions of location analyzer 116 and social media chatter analyzer 118, but the components are not individual entities. In a further embodiment, only one of location analyzer 116 and social media chatter analyzer 118 may be integrated into automated merchandising engine 114 while the other component is an individual entity. Automated merchandising engine 114 is depicted and described in further detail with respect to FIG. 2.

Location analyzer 116 uses one or more of a plurality of techniques known in the art to determine a user's location. For example, if the user accesses electronic store 110 with client computing device 104, and client computing device 104 is a laptop computer, location analyzer 116 may determine the user's location based on cookies associated with the internet protocol (IP) address of the laptop computer. In another example, if a user accesses electronic store 110 with client computing device 104, and client computing device 104 is a smart phone, location analyzer 116 may determine the user's location based on a global positioning service (GPS) device within the smart phone. In a further example, location analyzer 116 may determine the user's location by determining an address associated with the user's social media account or other accounts associated with client computing device 104.

Social media chatter analyzer 118 analyzes social media applications for location-specific social media chatter that relates to one or more products in database 112. Social media applications are platforms for building online social networks among people who share interests, activities, backgrounds, and/or real-life connections. Social media applications are web-based services that allow individuals to create a public or private profile, to create a list of users with whom to share connections, and to view and interact with the connections within the system. Social media applications may also include communication tools such as mobile connectivity, photo and video sharing, and blogging. Social media chatter analyzer 118 receives a location from location analyzer 116 and mines a plurality of social media applications for any mention of products in database 112 by users located within a pre-defined distance from the location of the user of client computing device 104.

Figure 2:
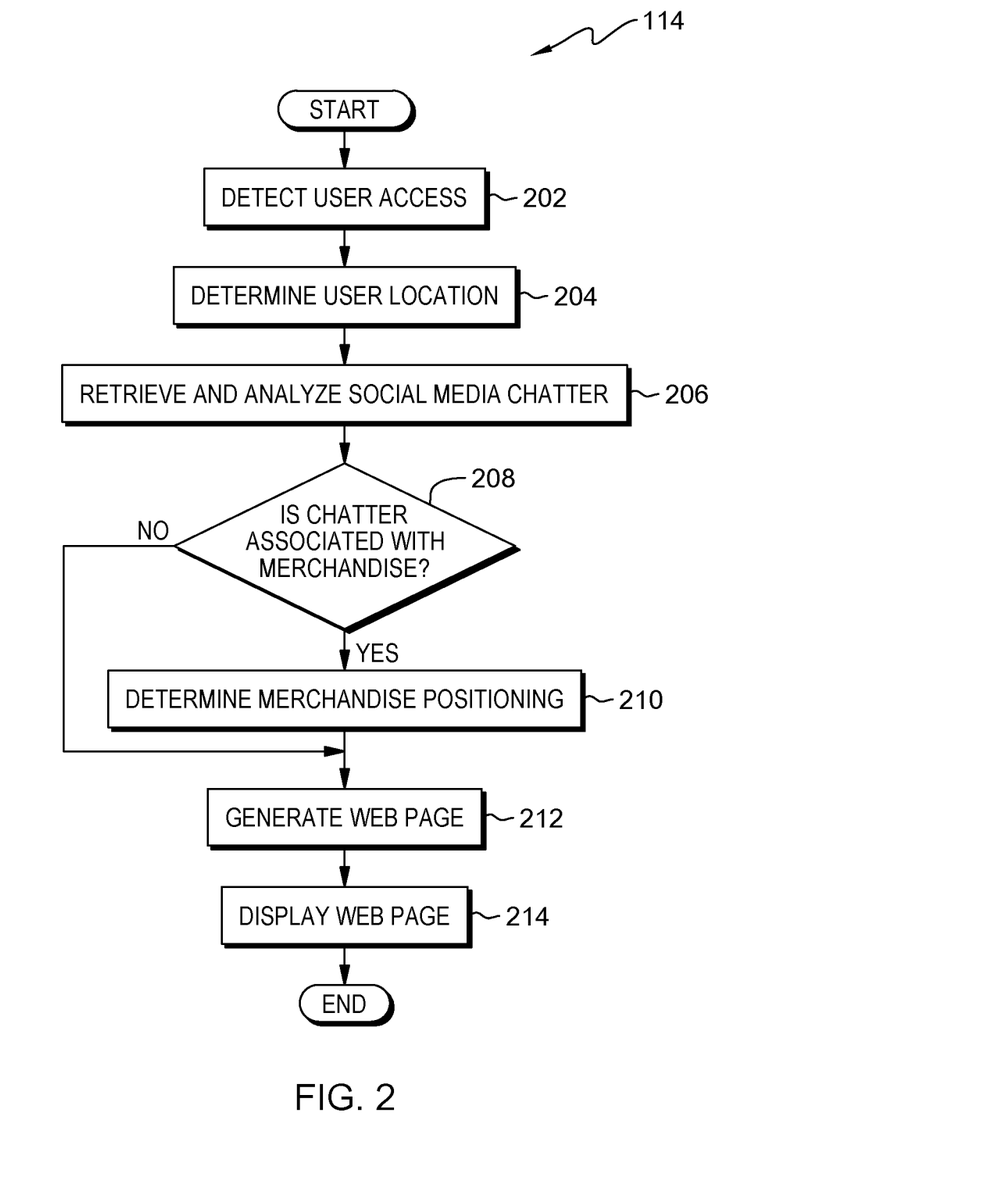
FIG. 2 is a flowchart depicting operational steps of an automated merchandising engine, on a server computer within the distributed data processing environment of FIG. 1, for multichannel merchandising by an electronic store, in accordance with an embodiment of the present invention.

FIG. 2 is a flowchart depicting operational steps of automated merchandising engine 114, on server computer 108 within distributed data processing environment 100 of FIG. 1, for multichannel merchandising by electronic store 110, in accordance with an embodiment of the present invention.

Automated merchandising engine 114 detects user access (step 202). When a user of client computing device 104 accesses electronic store 110, via user interface 106, automated merchandising engine 114 detects the user's access.

Automated merchandising engine 114 determines the user's location (step 204). In one embodiment, automated merchandising engine 114 determines the user's location using location analyzer 116. Automated merchandising engine 114 determines the user's location via one or more of a plurality of location detection techniques known in the art, as discussed with respect to FIG. 1. In one embodiment, automated merchandising engine 114 may determine the user's location to a specific street address. In another embodiment, automated merchandising engine 114 may determine the user's location to a geographic region, such as a state in the United States. In a further embodiment, if the user is registered with or has an account with electronic store 110, the user may pre-set a location for automated merchandising engine 114 to use.

Automated merchandising engine 114 retrieves and analyzes social media chatter (step 206). In one embodiment, automated merchandising engine 114 retrieves and analyzes social media chatter using social media chatter analyzer 118. Based on the determined user location, automated merchandising engine 114 retrieves social media chatter posted by users associated with the location of the user of client computing device 104. Automated merchandising engine 114 determines locations of users posting social media chatter in one or more of a plurality of techniques known in the art to determine a user's location, as discussed with respect to FIG. 1. In one embodiment, automated merchandising engine 114 employs location analyzer 116 to determine the location of the social media users. In one embodiment, automated merchandising engine 114 retrieves social media chatter from a pre-defined radius around the user's location. For example, if the user is located on a specific street corner, automated merchandising engine 114 may retrieve any social media chatter from other users within a city block, or within the city limits, or within the state in which the city is located. In another embodiment, automated merchandising engine 114 may retrieve varying amounts of social media chatter based on the distance between the location of the social media users and the location of the user of client computing device 104. For example, automated merchandising engine 114 may retrieve the top 50 chatter topics in an area local to the user, while retrieving the top 30 chatter topics in a radius of 50 to 100 miles around the user's location, and retrieve the top two chatter topics within the state or country of the user's location. In another embodiment, automated merchandising engine 114 may retrieve social media chatter by using a pre-defined number of posts. For example, automated merchandising engine 114 may retrieve a maximum of 1000 posts, and the posts may be distributed across locations by distance, i.e., if there are only 500 posts from users located within a 50 mile radius, then automated merchandising engine 114 may retrieve the next 500 posts from users located in a 100 mile radius. In yet another embodiment, a social media user may register with automated merchandising engine 114 such that automated merchandising engine 114 retrieves social media posts from the registered social media user when a user of client computing device 104 is within a pre-defined distance of the registered social media user.

In an embodiment, automated merchandising engine 114 may retrieve data associated with the user through additional communication channels, other than the website of electronic store 110. For example, if the user has a login ID to electronic store 110, then when the user logs in to electronic store 110, automated merchandising engine 114 can recognize the user's identity and search for additional records relating to the user's past interactions with electronic store 110. For example, automated merchandising engine 114 may determine that the user has called electronic store 110's customer service phone number in the past and then analyze social media chatter related to electronic store 110's customer service or the topic which the user discussed with customer service. In another example, automated merchandising engine 114 may determine the user has purchased products in a physical store associated with electronic store 110.

Automated merchandising engine 114 analyzes the social media chatter to determine what users are chatting about and finds any references to categories or products in the catalog of electronic store 110, for example, via a keyword search analysis and known matching techniques. In one embodiment, automated merchandising engine 114 may weight the relevance of the social media chatter by the distance of the users participating in the chatter from the location of the user accessing electronic store 110. For example, automated merchandising engine 114 may place a higher importance on social media chatter within the city in which the user is located than on social media chatter from around the state in which the user is located. In another embodiment, automated merchandising engine 114 may weight the relevance of the social media chatter by the closeness of a match to categories or products in the catalog of electronic store 110. For example, electronic store 110 is called fictionalretailer.com and sells t-shirts. If automated merchandising engine 114 determines there is chatter about t-shirts from fictionalretailer.com, then automated merchandising engine 114 may weight the match higher than if the chatter is about t-shirts in general.

In one embodiment, automated merchandising engine 114 retrieves and analyzes social media chatter as soon as the user accesses electronic store 110. In another embodiment, automated merchandising engine 114 retrieves and analyzes social media chatter each time the user chooses a product or category within the catalog of electronic store 110. In one embodiment, automated merchandising engine 114 retrieves and analyzes real time social media chatter. In another embodiment, automated merchandising engine 114 retrieves and analyzes historical social media chatter. In the embodiment, historical social media chatter may be limited to a pre-defined time interval prior to the time the user accesses electronic store 110. In a further embodiment, automated merchandising engine 114 may combine both real time and historical social media chatter for analysis.

Automated merchandising engine 114 determines whether the social media chatter is associated with merchandise (decision block 208). Based on the analysis of the retrieved social media chatter, automated merchandising engine 114 determines whether any of the chatter is associated with one or more categories or products within the catalog of electronic store 110. If automated merchandising engine 114 determines the social media chatter is associated with merchandise ("yes" branch, decision block 208), then automated merchandising engine 114 determines merchandise positioning (step 210). Automated merchandising engine 114 customizes merchandise positioning on the web page of electronic store 110 or in search results associated with electronic store 110 based on the relevance of the social media chatter to the user's location. Automated merchandising engine 114 can dynamically adjust positioning of categories or products in response to the social media chatter analysis. In an embodiment, automated merchandising engine 114 can also customize category or product positioning in a push notification, text message, email message, etc.

In one embodiment, automated merchandising engine 114 calculates a merchandising score based on the analysis of the retrieved social media chatter. A merchandising score may be, for example, a measure of relevance of the chatter to a product category accessed by the user. For example, if the user accesses a category called "t-shirts," and automated merchandising engine 114 determines there is social media chatter regarding wearing white t-shirts to a football game, automated merchandising engine 114 may calculate a higher merchandising score for t-shirts than for jeans, and further, may calculate a higher merchandising score for white t-shirts than for red t-shirts. The merchandising score may be, for example, a confidence level in the relevance of the chatter to the user's chosen product category, calculated on a scale of zero to 100 percent. In the previous t-shirt example, the confidence level may be 95% that the discussion of white t-shirts is relevant to the user's product search. In an embodiment, rules or ranges may be pre-defined such that a particular score can cause automated merchandising engine 114 to boost, i.e., adjust to a more prominent position, or bury, i.e., adjust to a less prominent position (or eliminate the position), of the product to varying degrees on the web page associated with electronic store 110.

In one embodiment, automated merchandising engine 114 determines whether the references to categories or products in the retrieved social media chatter is positive or negative. Automated merchandising engine 114 may use one or more techniques of natural language processing (NLP) known in the art to determine whether the retrieved social media chatter is positive or negative. If automated merchandising engine 114 determines the chatter is positive, then automated merchandising engine 114 boosts the associated category or product such that the positioning of the category or product is more prominent than current positioning of the referenced category or product on the web site, or within search results, of electronic store 110. If automated merchandising engine 114 determines the chatter is negative, then automated merchandising engine 114 buries the associated category or product such that the positioning of the category or product is less prominent than (or eliminated from) current positioning of the referenced category or product on the web site, or within search results, of electronic store 110.

Responsive to determining merchandise positioning, or if automated merchandising engine 114 determines the social media chatter is not associated with merchandise ("no" branch, decision block 208), then automated merchandising engine 114 generates a web page (step 212). Once automated merchandising engine 114 determines the positioning of the category or product associated with the retrieved social media chatter, automated merchandising engine 114 generates either a web page that includes the category or product or a web page that includes search results for the category or product with the customized positioning of the category or product on the page as determined in step 210. If the social media chatter was not associated with merchandise in electronic store 110, then automated merchandising engine 114 generates a standard web page without customizing product positioning. In one embodiment, automated merchandising engine 114 may determine communication channels in addition to the web page through which to position a category or product for the user. For example, automated merchandising engine 114 may send an email to the user that includes a discount offer for the category or product the user accessed in electronic store 110. In another example, automated merchandising engine 114 may alert a system administrator to send the user a hard copy coupon or catalog in the mail.

Automated merchandising engine 114 displays the web page (step 214). In response to generating the web page, automated merchandising engine 114 displays the web page to the user, via user interface 106.

Figure 3:
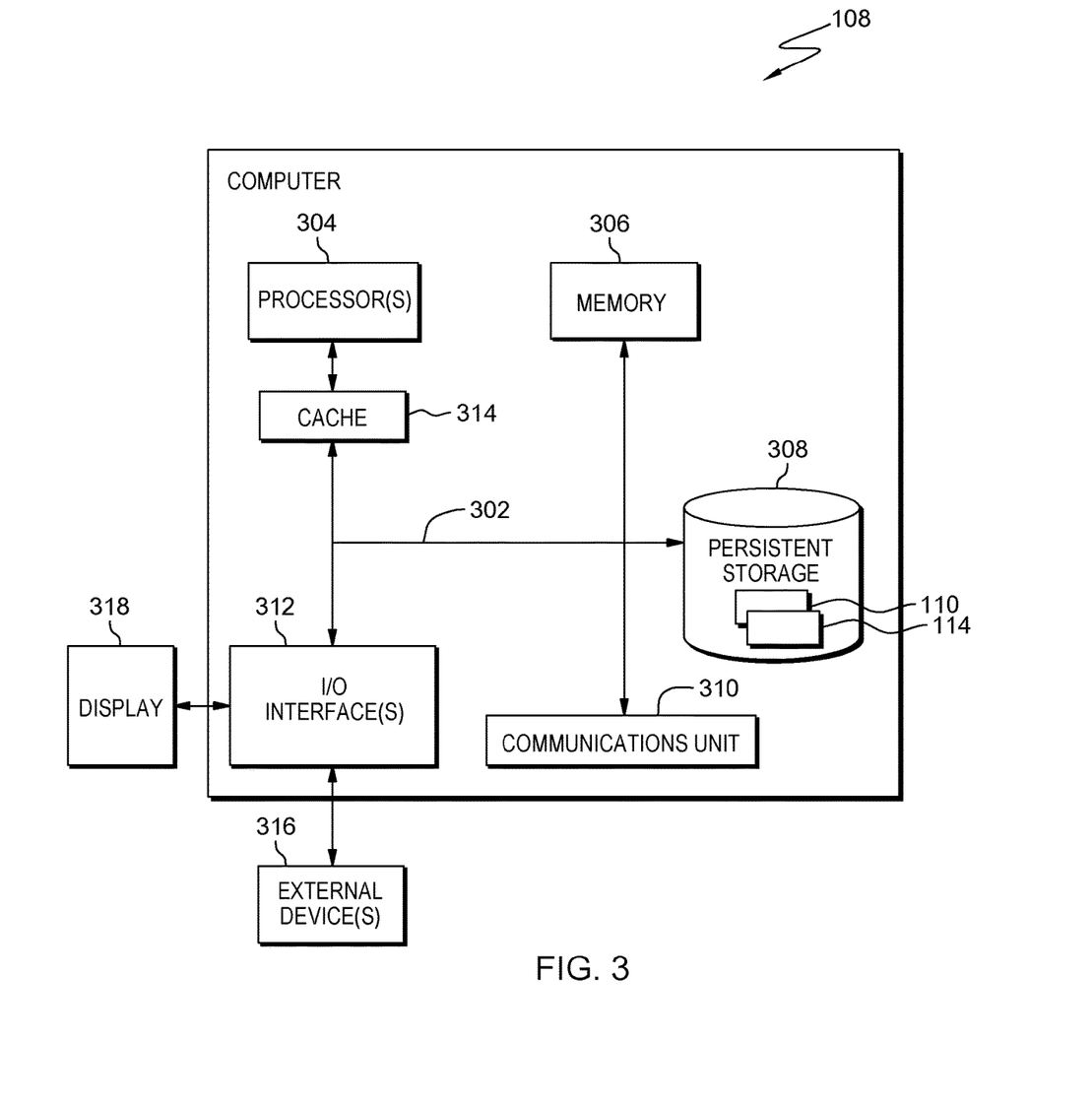
FIG. 3 depicts a block diagram of components of the server computer executing the automated merchandising engine within the distributed data processing environment of FIG. 1, in accordance with an embodiment of the present invention.

FIG. 3 depicts a block diagram of components of server computer 108 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Server computer 108 can include processor(s) 304, cache 314, memory 306, persistent storage 308, communications unit 310, input/output (I/O) interface(s) 312 and communications fabric 302. Communications fabric 302 provides communications between cache 314, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM). In general, memory 306 can include any suitable volatile or non-volatile computer readable storage media. Cache 314 is a fast memory that enhances the performance of processor(s) 304 by holding recently accessed data, and data near recently accessed data, from memory 306.

Program instructions and data used to practice embodiments of the present invention, e.g., electronic store 110 and automated merchandising engine 114 are stored in persistent storage 308 for execution and/or access by one or more of the respective processor(s) 304 of server computer 108 via cache 314. In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of client computing device 104. In these examples, communications unit 310 includes one or more network interface cards. Communications unit 310 may provide communications through the use of either or both physical and wireless communications links. Electronic store 110 and automated merchandising engine 114 may be downloaded to persistent storage 308 of server computer 108 through communications unit 310.

I/O interface(s) 312 allows for input and output of data with other devices that may be connected to server computer 108. For example, I/O interface(s) 312 may provide a connection to external device(s) 316 such as a keyboard, a keypad, a touch screen, a microphone, a digital camera, and/or some other suitable input device. External device(s) 316 can also include portable computer readable storage media such as, for example, thumb drives, portable optical or magnetic disks, and memory cards. Software and data used to practice embodiments of the present invention, e.g., electronic store 110 and automated merchandising engine 114 on server computer 108, can be stored on such portable computer readable storage media and can be loaded onto persistent storage 308 via I/O interface(s) 312. I/O interface(s) 312 also connect to a display 318.

Display 318 provides a mechanism to display data to a user and may be, for example, a computer monitor. Display 318 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for generating a web page, the method comprising:

detecting, by one or more computer processors, access to a web page associated with an electronic store by a user via a computing device;

determining, by the one or more computer processors, a geo-location of the computing device via a global positioning service (GPS) device within the computing device;

mining, by the one or more computer processors, one or more social media applications for social media communications associated with the geo-location of the computing device, wherein social media communications include one or more publicly available entries made by one or more other individuals using one or more social media applications;

retrieving, by the one or more computer processors, a first quantity of social media communications based on a geo-location of the one or more other individuals using one or more social media applications within a first pre-defined radius of the geo-location of the computing device;

retrieving, by the one or more computer processors a second quantity of social media communications based on a geo-location of the one or more other individuals using one or more social media applications between the first pre-defined radius and a second pre-defined radius of the geo-location of the computing device;

retrieving, by the one or more computer processors a third quantity of social media communications based on a geo-location of the one or more other individuals using one or more social media applications between the second pre-defined radius and a third pre-defined radius of the geo-location of the computing device, wherein the first pre-defined radius is smaller than the second pre-defined radius and the second pre-defined radius is smaller than the third pre-defined radius;

determining, by the one or more computer processors, whether the retrieved social media communications are associated with one or more merchandise associated with the electronic store;

responsive to determining the retrieved social media communications are associated with the one or more merchandise associated with the electronic store, determining, by the one or more computer processors, the retrieved social media communications are negative using one or more natural language processing techniques;

determining, by the one or more computer processors, a current position of a reference to the one or more merchandise in one or more communication channels associated with the electronic store by determining prominence of the reference to the one or more merchandise in a push notification using the one or more natural language processing techniques; and generating, by the one or more computer processors, a web page associated with the electronic store by adjusting, by the one or more computer processors, based on the negative retrieved social media communications, a placement of the reference to the one or more merchandise to appear in a less prominent position in the one or more communication channels than the current position.

2. The method of claim 1, further comprising:
   displaying, by the one or more computer processors, the web page to the user.

3. The method of claim 1, wherein determining a current position of a reference to the one or more merchandise in one or more communication channels further comprises calculating, by the one or more computer processors, a merchandise score, wherein the merchandise score is based on a relevance of the retrieved social media communications to a product category accessed by the user.

4. The method of claim 1, wherein determining a current position of a reference to the one or more merchandise in one or more communication channels further comprises determining, by the one or more computer processors, prominence of the reference to the one or more merchandise in at least one of: a web page, one or more search results, an email, a catalog, a text message, or a coupon.

5. The method of claim 1, wherein retrieving a plurality of social media communications associated with the geo-location of the computing device further comprises:
retrieving, by the one or more computer processors, a number of social media communications that varies based on a distance between a geo-location of the one or more other individuals using one or more social media applications and the geo-location of the computing device.

6. The method of claim 1, wherein determining a position of the one or more merchandise in one or more communication channels further comprises:
determining, by the one or more computer processors, whether the retrieved social media communications are positive or negative;
responsive to determining the retrieved social media communications are positive, adjusting, by the one or more computer processors, a placement of the reference to the one or more merchandise to a more prominent position in a communication channel than a current position; and
responsive to determining the retrieved social media communications are negative, eliminating, by the one or more computer processors, the reference to the one or more merchandise.

7. A computer program product for generating a web page, the computer program product comprising:
one or more computer readable storage device and program instructions stored on the one or more computer readable storage device, the stored program instructions comprising:
program instructions to detect access to a web page associated with an electronic store by a user via a computing device;
program instructions to determine a geo-location of the computing device via a global positioning service (GPS) device within the computing device;
program instructions to mine one or more social media applications for social media communications associated with the geo-location of the computing device, wherein social media communications include one or more publicly available entries made by one or more other individuals using one or more social media applications;
program instructions to retrieve a first quantity of social media communications based on a geo-location of the one or more other individuals using one or more social media applications within a first pre-defined radius of the geo-location of the computing device;
program instructions to retrieve a second quantity of social media communications based on a geo-location of the one or more other individuals using one or more social media applications between the first pre-defined radius and a second pre-defined radius of the geo-location of the computing device;
program instructions to retrieve a third quantity of social media communications based on a geo-location of the one or more other individuals using one or more social media applications between the second pre-defined radius and a pre-defined third radius of the geo-location of the computing device, wherein the first pre-defined radius is smaller than the second pre-defined radius and the second pre-defined radius is smaller than the third pre-defined radius;
program instructions to determine whether the retrieved social media communications are associated with one or more merchandise associated with the electronic store;
responsive to determining the retrieved social media communications are associated with the one or more merchandise associated with the electronic store, program instructions to determine the retrieved social media communications are negative using one or more natural language processing techniques;
program instructions to determine a current position of a reference to the one or more merchandise in one or more communication channels associated with the electronic store by determining prominence of the reference to the one or more merchandise in a push notification using the one or more natural language processing techniques; and
program instructions to generate a web page associated with the electronic store by adjusting, based on the negative retrieved social media communications, a placement of the reference to the one or more merchandise to appear in a less prominent position in the one or more communication channels than the current position.

8. The computer program product of claim 7, the stored program instructions further comprising:
program instructions to display the web page to the user.

9. The computer program product of claim 7, wherein the program instructions to determine a current position of a reference to the one or more merchandise in one or more communication channels comprise program instructions to calculate a merchandise score, wherein the merchandise score is based on a relevance of the retrieved social media communications to a product category accessed by the user.

10. The computer program product of claim 7, wherein the program instructions to determine a current position of a reference to the one or more merchandise in one or more communication channels comprise program instructions to determine prominence of the reference to the one or more merchandise in at least one of: a web page, one or more search results, an email, a catalog, a text message, or a coupon.

11. The computer program product of claim 7, wherein the program instructions to retrieve a plurality of social media communications associated with the geo-location of the computing device comprise program instructions to retrieve a number of social media communications that varies based on a distance between a geo-location of the one or more other individuals using one or more social media applications and the geo-location of the computing device.

12. The computer program product of claim 7, wherein the program instructions to determine a position of the one or more merchandise in one or more communication channels comprise:
program instructions to determine whether the retrieved social media communications are positive or negative;
responsive to determining the retrieved social media communications are positive, program instructions to adjust a placement of the reference to the one or more merchandise to a more prominent position in a communication channel than a current position; and responsive to determining the retrieved social media communications are negative, program instructions to eliminate the position of the reference to the one or more merchandise.

13. A computer system for generating a web page, the computer system comprising:
one or more computer processors;
one or more computer readable storage device;
program instructions stored on the one or more computer readable storage device for execution by at least one of the one or more computer processors, the stored program instructions comprising:
program instructions to detect access to a web page associated with an electronic store by a user via a computing device;
program instructions to determine a geo-location of the computing device via a global positioning service (GPS) device within the computing device;
program instructions to mine one or more social media applications for social media communications associated with the geo-location of the computing device, wherein social media communications include one or more publicly available entries made by one or more other individuals using one or more social media applications;
program instructions to retrieve a first quantity of social media communications based on a geo-location of the one or more other individuals using one or more social media applications within a first pre-defined radius of the geo-location of the computing device;
program instructions to retrieve a second quantity of social media communications based on a geo-location of the one or more other individuals using one or more social media applications between the first pre-defined radius and a second pre-defined radius of the geo-location of the computing device;
program instructions to retrieve a third quantity of social media communications based on a geo-location of the one or more other individuals using one or more social media applications between the second pre-defined radius and a third pre-defined radius of the geo-location of the computing device, wherein the first pre-defined radius is smaller than the second pre-defined radius and the second pre-defined radius is smaller than the third pre-defined radius;
program instructions to determine whether the retrieved social media communications are associated with one or more merchandise associated with the electronic store;
responsive to determining the retrieved social media communications are associated with the one or more merchandise associated with the electronic store, program instructions to determine the retrieved social media communications are negative using one or more natural language processing techniques;
program instructions to determine a current position of a reference to the one or more merchandise in one or more communication channels by determining prominence of the reference to the one or more merchandise in a push notification using the one or more natural language processing techniques; and
program instructions to generate a web page associated with the electronic store by adjusting a placement of the reference to the one or more merchandise to appear in a less prominent position in the one or more communication channels than the current position.

14. The computer system of claim 13, the stored program instructions further comprising:
program instructions to display the web page to the user.

15. The computer system of claim 13, wherein the program instructions to determine a current position of a reference to the one or more merchandise in one or more communication channels comprise program instructions to calculate a merchandise score, wherein the merchandise score is based on a relevance of the retrieved social media communications to a product category accessed by the user.

16. The computer system of claim 13, wherein the program instructions to retrieve a plurality of social media communications associated with the geo-location of the computing device comprise program instructions to retrieve a number of social media communications that varies based on a distance between a geo-location of the one or more other individuals using one or more social media applications and the geo-location of the computing device.

17. The computer system of claim 13, wherein the program instructions to determine a position of the one or more merchandise in one or more communication channels comprise:
program instructions to determine whether the retrieved social media communications are positive or negative;
responsive to determining the retrieved social media communications are positive, program instructions to adjust a placement of the reference to the one or more merchandise to a more prominent position in a communication channel than a current position; and
responsive to determining the retrieved social media communications are negative, program instructions to eliminate the position of the reference to the one or more merchandise.

* * * * *